Aug. 15, 1967    C. A. SECKERSON    3,335,633

RESILIENT FASTENER WITH PIERCING POINT

Filed Oct. 4, 1965

INVENTOR
Clifford Alexander Seckerson
by Philip E. Parker
Attorney.

United States Patent Office 3,335,633
Patented Aug. 15, 1967

3,335,633
RESILIENT FASTENER WITH PIERCING POINT
Clifford Alexander Seckerson, Iver Heath, England, assignor to United-Carr Incorporated, Boston, Mass., a corporation of Delaware
Filed Oct. 4, 1965, Ser. No. 492,820
Claims priority, application Great Britain, Oct. 12, 1964, 41,542/64
3 Claims. (Cl. 85—80)

The present invention relates to a fastener which is particularly although not exclusively suitable for attaching a resilient strip member, such as a sealing strip to an apertured support.

According to the invention there is provided a fastener for attaching a resilient strip member to an apertured support, the fastener comprising a head and a shank depending therefrom and the shank having an outwardly extending resiliently compressible portion for snap-engagement in the aperture in the support, a tapered nose adapted to pierce the strip member when the strip member is laid over the aperture in the support and, adjacent the nose, a circumferentially continuous downwardly directed shoulder adapted to shear the material of the strip member as the shoulder is forced down through the aperture in the support and to form a hole in the strip member for the passage therethrough of the resiliently compressible portion of the shank.

According to a further aspect of the invention there is also provided an assembly of a resilient strip member attached to an apertured support with the aid of a fastener as defined in the preceding paragraph, wherein the strip member is clamped between the support and the head of the fastener, the shank extends through a hole in the strip member sheared therein by the shoulder on the shank of the fastener as the shoulder was forced through the strip member and into the aperture in the support and wherein the shank is resiliently compressed in tight frictional engagement in the aperture in the support.

Figures 1, 2:
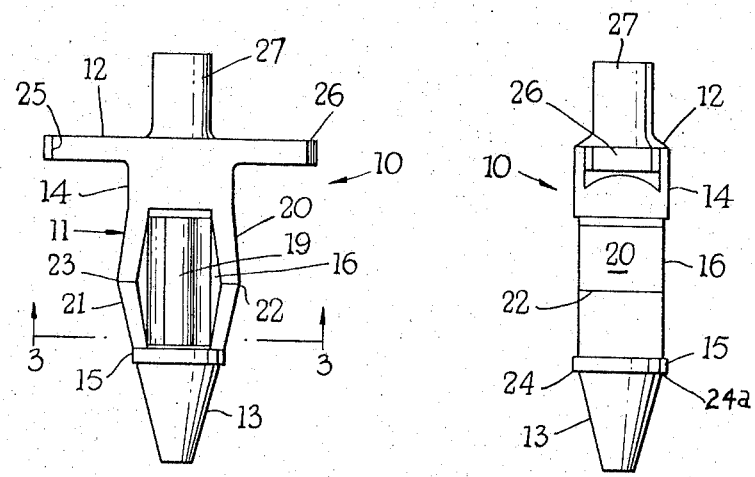
Figure 5:
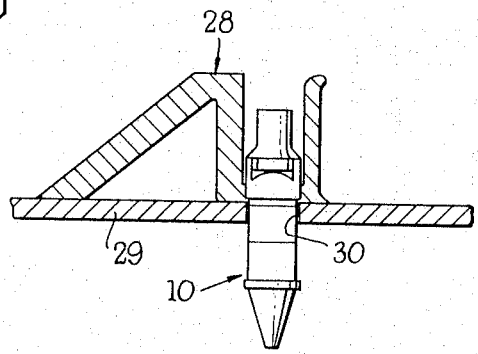

A preferred form of the invention will now be described with reference to the accompanying drawings in which:

FIGURE 1 is a front elevation of a fastener;
FIGURE 2 is a side elevation of the fastener shown in FIGURE 1,
FIGURE 3 is a sectional view taken on the line 3—3 of FIGURE 1,
FIGURE 4 is a cross sectional view of an elongate sealing strip which may be secured to an apertured support with the aid of fasteners according to the invention, and
FIGURE 5 is an elevation, partly in section of an assembly comprising a rubber sealing strip of the kind shown in FIGURE 4 secured to an apertured support with the aid of the fastener of FIGURES 1 to 3.

Figure 3:
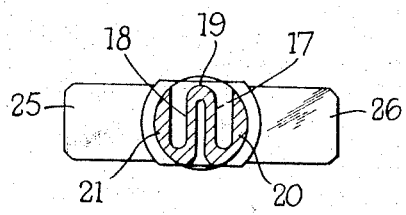
Figure 4:
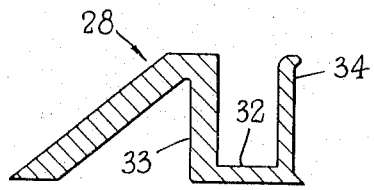

In FIGURES 1 to 3 a fastener is indicated generally at 10. The fastener 10 is formed, preferably by injection moulding, from a synthetic plastics material and comprises an elongate shank 11 which depends from a head 12 and which has a tapered solid nose 13.

The shank 11 has upper and lower cylindrical wall portions 14 and 15 which are externally of slightly smaller diameter than the aperture in the support through which the shank 11 is to be inserted and an intermediate portion 16 which is resiliently compressible and adapted for frictional engagement in an apertured support.

In the fastener 10 illustrated herein, the intermediate portion 16 of the shank comprises a lengthwise extending U-shaped web 17, 18, 19 which joins two oppositely positioned side walls 20 and 21 and which allows the side walls to be resiliently compressed towards one another. The side walls 20 and 21 slope outwardly from the head 12 to form shoulders 22 and 23 which are positioned halfway along the length of the side walls and thus at the position of maximum compression.

It will be appreciated that the shaping of the intermediate portion 16 may be modified provided that it is resiliently compressible.

Adjacent the nose 13 the shank 11 is provided with a circumferentially continuous annular surface 24a lying at right angles to the longitudinal axis of the shank and forming with the lower cylindrical wall portion 15 a shoulder 24.

The head 12 comprises two arms 25 and 26 which are aligned at right angles to the longitudinal axis of the shank and which extend outwardly from a cylindrical pin 27 which is co-axial with the shank.

The fastener 10 is used in the manner shown in FIGURE 5 to attach a resilient strip member, for instance, a sealing strip 28 to a flat support 29 formed with a series of circular apertures 30, only one of which is shown in the drawings.

The strip member 28 is formed from a flexible and relatively soft material such as a synthetic rubber or a synthetic resin and comprises a flat web 32 joining two parallel upstanding flanges 33 and 34. The flange 33 is extended and folded back to form an inclined buffer or seal.

In order to attach the member 28 to the support 29 the member 28 is laid on the support with the flat web 32 overlying the row of apertures 30. A fastener 10 which is either held manually or with a suitable tool, is then brought up to the web 32 opposite each aperture 30 and the tapered nose 13 of each fastener is forced through the web and into an aperture 30.

Initially, the tapered nose 13 punctures and stretches the material of the web 32 until the shoulder 24 of the shank comes into contact with the web. The shoulder 24 co-operates with the rim of the aperture 30 in the manner of a punch and die and, as it passes into the aperture 30 it shears through the web 32 cutting a clean circular aperture in the web through which the remainder of the shank can pass.

The portion of the web 32 which is cut away is carried through the aperture 30 and falls away and the shank is then pressed firmly down into the aperture 30 to clamp the web 32 between the support 29 and the head 12 of the fastener.

The diameter of the aperture 30 is such that the side walls 20 and 21 of the intermediate portion 16 of the shank have to be compressed together in order to allow the shoulders 22 and 23 to pass through the aperture and thus, once installed, the fastener is securely held in the apertures, with the sloping shoulders 22 and 23 pulling the head 12 tightly down onto the web 32 of the strip member 28.

Because the shoulder 24 on the shank of the fastener 10 shears a clean circular aperture in the web of the strip member any tendency for the web 32 of the strip member to be drawn down into the aperture 30 in the support by the shank and thus distort the overall shape of the strip member is obviated or substantially reduced.

What I claim is:
1. A fastener for attaching a resilient strip member to an apertured support, the fastener comprising a head and a shank depending therefrom, said shank having an outwardly extending resiliently compressible portion for snap-engagement in the aperture in the support, a tapered nose adapted to pierce the strip member when the strip member is laid over the aperture in the support, said nose having a base portion and a circumferentially continuous shoulder adjacent said nose adapted to shear the material of the strip member against the edge of the aperture as the shoulder is forced down through the aperture in the support and to form a hole in the strip member for the passage therethrough of the resiliently compressible por- tion of the shank, said base portion having a diameter less than the diameter of said shoulder.

2. A fastener as claimed in claim 1, wherein the head comprises a pin coaxial with the shank and two arms extending outwardly and oppositely from the pin at right angles to the longitudinal axis of the shank.

3. A fastener as claimed in claim 1, wherein the shank in cross-section is of substantially W-shape.

References Cited

UNITED STATES PATENTS

| | | | |
|---|---|---|---|
| 2,223,594 | 12/1940 | Bednarek | 24—73 |
| 2,780,128 | 2/1957 | Rapata | 85—5 |
| 2,856,680 | 10/1958 | Johnson et al. | 85—1 |
| 2,901,796 | 9/1959 | Hope et al. | 24—214 |
| 2,932,073 | 4/1960 | Ridgway | 24—219 |
| 3,102,585 | 9/1963 | Kramer | 24—73 |
| 3,165,968 | 1/1965 | Anstett | 85—30 |

FOREIGN PATENTS

| | | |
|---|---|---|
| 1,216,512 | 11/1959 | France. |
| 1,335,953 | 7/1963 | France. |

CARL W. TOMLIN, *Primary Examiner.*

M. PARSONS, Jr., *Assistant Examiner.*